May 28, 1957 R. A. RAMEY, JR 2,794,173
MAGNETIC DIFFERENTIATING CIRCUIT
Filed Dec. 23, 1953 2 Sheets-Sheet 1
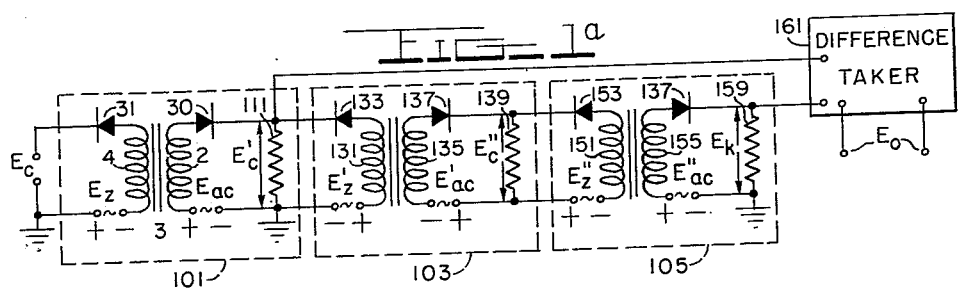
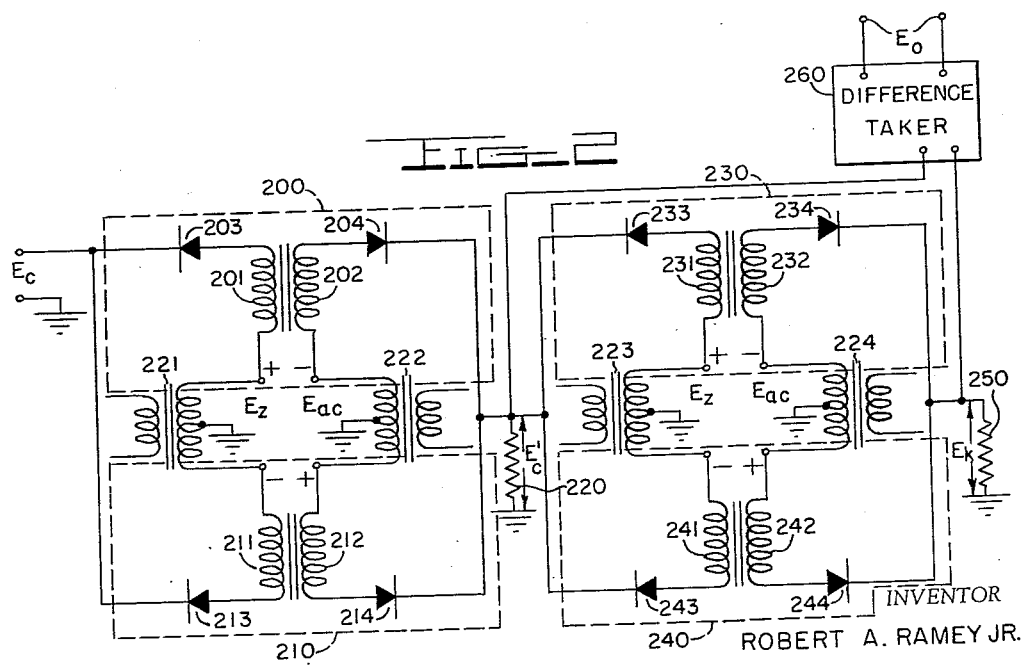
INVENTOR
ROBERT A. RAMEY JR.
BY
*T. Howard White* ATTORNEYS

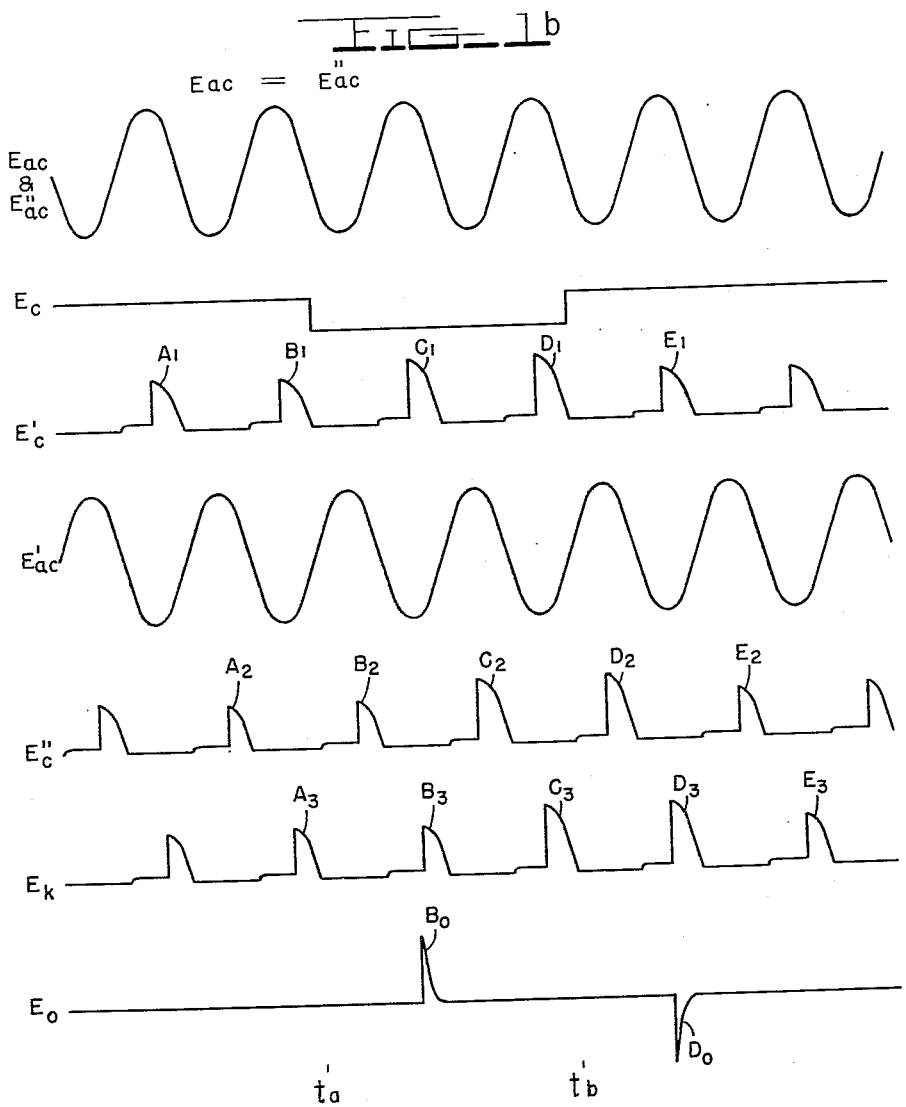

United States Patent Office 2,794,173
Patented May 28, 1957

2,794,173

MAGNETIC DIFFERENTIATING CIRCUIT

Robert A. Ramey, Jr., Pittsburgh, Pa.

Application December 23, 1953, Serial No. 400,152

9 Claims. (Cl. 333—19)

(Granted under Title 35, U. S. Code (1952), sec. 266)

This invention relates to electrical control and measuring systems, and more particularly to apparatus for detecting the time rate of change of an electrical signal to aid in decreasing the response time of control and measuring systems associated therewith.

Electrical differentiating systems have been widely used for control purposes for many years, generally assuming the form of derivative generators as shown in Patent No. 2,497,216 to M. L. Greenough, or a passive network of resistive and reactive components as shown in Patent No. 2,609,448 to L. H. Bedford et al., or as disclosed in copending application Serial No. 328,528 of D. G. Scorgie. When applied to control systems such as exhibited in "An improved servo amplifier," C. W. Lufey, A. E. Schmid, P. W. Barnhart, AIEE Technical Paper 52–235, such devices are not entirely satisfactory under many conditions of operation. For instance, when the control signal is a D. C. signal, all of the aforementioned differentiating devices will be entirely inoperative as they are responsive only to A. C. signals. A more significant situation exemplifying the shortcomings of the prior art is that where a first alternating signal is superimposed upon a D. C. signal or upon a second alternating signal, and it is desired to exercise control only in response to the signal on which the first A. C. signal is superimposed. The effect of the first alternating signal would only be exaggerated by the aforementioned prior art, and the response of the controlled device to the actual control signal would be considerably degraded.

In addition, it should also be noted that considerable attenuation is suffered by the signal in the prior art devices discussed above, and in many applications not only may this attenuation be undersirable but also control may be considerably enhanced if the differentiating device could be made to serve as an amplifier. Accordingly, one object of this invention is to provide a system for detecting the derivative of a given function or electrical signal.

Another object of this invention is to produce a system for evaluating the time rate of change of an electrical signal over discrete intervals of time.

A further object of this invention is to provide a system for detecting the time rate of change of an electrical signal wherein the output signal may be controllably amplified or attenuated.

Still another object of this invention is to provide a system for determining the derivative function of either an alternating or a D. C. signal.

Other objects and features of the present invention will become apparent upon consideration of the following detailed description taken together with the accompanying drawings which illustrate various embodiments of the invention. It is to be expressly understood, however, that the drawings are designed for purposes of illustration only and are not intended as a definition of the limits of the invention, reference for the latter purpose is to be had to the appended claims.

In the drawings:

Figure 1a is a diagrammatic representation of one embodiment of a differentiating circuit constructed in accordance with applicant's invention.

Figure 1b is a waveform representation of the voltages at various points in the circuit of Figure 1a, useful in understanding the operation thereof.

Figure 2 is a diagrammatic representation of another embodiment of applicant's invention.

The present invention contemplates a signal differentiation system, wherein a delay network is utilized to provide a time denominator over which the variation in amplitude of the signal to be measured may be placed and thereby provide a resultant $$\frac{\Delta E}{\Delta t}$$

or time derivative signal. In the present instance the invention contemplates the use of at least a pair of magnetic amplifiers of the type disclosed in my co-pending application Serial No. 237,813, filed July 20, 1951, each of which have alternately a reset half-cycle during which the magnetization level is set by a control signal and a forward half-cycle during which an output pulse is produced in dependency on the magnetization level of the amplifier. The signal to be differentiated is applied to the amplifiers to control the magnetization levels thereof and the output pulse of one amplifier produced as a result of the input signal during one brief interval of time is compared with the output pulse produced from the other amplifier as a result of the input signal during a similar but subsequent interval of time. The difference in the output signals is a measure of the time differential of the change in the input signal.

A typical embodiment of the present invention is depicted in Figure 1a. Therein are shown three cascade connected magnetic amplifying devices 101, 103 and 105, such as illustrated and described in my aforementioned co-pending application Serial No. 237,813, connected in a unique arrangement that will be described presently. Before proceeding with a detailed description of the invention, a brief discussion of the basic magnetic amplifier is in order. Reference is made to application Serial No. 237,813 for a complete and detailed explanation of the theory and operation of said magnetic amplifier.

The numbering of the components of magnetic amplifier 101 are in conformity with Figure 1 of my application Serial No. 237,813. A control voltage $E_c$, which for purposes of explanation is herein considered D. C. but may be A. C., an alternating voltage $E_z$, and a unilateral conducting element 31 (typically, a diode rectifier) are connected in series with a control winding 4 of saturable core 3. This core preferably has square-loop hysteresis characteristics such as are obtained by the use of materials such as Deltamax and Orthonol. The polarity of element 31 is such as to oppose the flow of current from potential $E_c$ to the control winding 4. A load winding 2 of the core 3 is coupled to load resistor 111 by means of unilateral conducting element 30 which is polarized so as to permit current flow only from the control winding 2 to the load resistor. An alternating voltage $E_{ac}$, the magnitude of which is preferably near the maximum the core will absorb without saturation, is connected between the other terminal of the load winding 2 and load resistor 111. $E_{ac}$ and $E_z$ are of the same frequency and the connection of these voltages to the load and control windings 2 and 4 respectively, is poled relative to elements 30 and 31 such that conduction takes place in the latter elements only during alternate half-cycles of applied voltage. The instantaneous phase of these voltages during one half-cycle thereof is indicated by the plus-minus signal shown in the drawing.

The operation of this circuit is as follows: Assume first that $E_{ac}$ is of constant potential as shown in Figure 1b and that $E_z = nE_{ac}$, "n" being the turns ratio of winding 2 to winding 4. On positive (forward) half-cycles of $E_{ac}$, rectifier 30 will conduct and the current through winding 2, element 30 and resistance 111 will be limited to the magnetizing current of core 3 until saturation is reached, and will thereafter be limited only by the resistance in the circuit. The voltage $E'_c$ across resistance 111 will be quite small and of virtually constant amplitude at the beginning of the half-cycle until the core is saturated, then will rise sharply and generally follow the curvature of $E_{ac}$ during the remainder of the forward half-cycle. During the negative (or reset) half-cycle of $E_{ac}$ ($E_z$ swings positive during this time) element 30 blocks the application of $E_{ac}$ to winding 2, but element 31 can now conduct and $E_z$ is applied to winding 4 to withdraw the core from saturation and to set its magnetization level to some value below saturation. Demagnetizing current will flow after $E_z$ has overcome the potential of $E_c$, and the core will thus be set to a level of magnetization determined by the values of $E_c$ and $E_z$. The time during the next forward half-cycle of $E_{ac}$ at which the core again becomes saturated and the output voltage across resistance 111 increases to the instantaneous value of $E_{ac}$, is thus dependent (when $E_z$ is of unvarying magnitude) on the value of $E_c$ since $E'_c$ controls the conduction of element 31 and thus the magnetization level to which the core is set by the reset voltage $E_z$. As pointed out in the above references, $E_c$ may also be either a pulsating D. C. voltage or an alternating voltage if proper precautions are taken.

Referring now more generally to Figure 1a, it can be seen that the reset circuit of amplifier 103 comprises winding 131, alternating reset voltage $E'_z$ and unilateral conducting element 133. Winding 131 corresponds to winding 4 of amplifier 101, element 133 corresponding to element 31, and $E'_z$ to $E_z$. The output voltage of amplifier 101 across resistance 111 corresponds to control voltage $E_c$ insofar as amplifier 103 standing alone is concerned. Likewise winding 135 corresponds to winding 2, unilateral conducting element 137 to element 30, and $E'_{ac}$ to $E_{ac}$. The output voltage of amplifier 103 is derived across resistance 139. Amplifier 105 is exactly the same as amplifier 103, elements 153 and 157, windings 151 and 155, alternating voltage $E''_z$ and $E''_{ac}$ corresponding respectively to elements 133 and 137, windings 131 and 135, and alternating voltages $E'_z$ and $E'_{ac}$. The control voltage for amplifier 105 is taken across resistance 139, and the output voltage $E_k$ appears across resistance 159.

The voltages appearing across resistance elements 111 and 159 are applied to a difference taker 161, the function of which is to subtract one voltage from the other. The output voltage from difference taker 161 is the desired differential $$\frac{\Delta E_c}{\Delta t}$$

as will be shown. Difference taker 161 may be any of a number of devices that are used to determine the difference of two voltages, such, for example, as shown in Patent No. 1,968,068 to J. R. J. G. Blancard et al.

The various reset voltages $E_z$, $E'_z$, and $E''_z$ may be derived from a single source, so long as the instantaneous phases when applied to the circuit are as shown in Figure 1a. $E_z$ and $E''_z$ are in phase, but $E'_z$ must be 180° out of phase with both $E_z$ and $E''_z$. Similarly, $E_{ac}$, $E'_{ac}$ and $E''_{ac}$ may be derived from a single source with $E_{ac}$ and $E''_{ac}$ in phase, and $E'_{ac}$ being 180° out of phase with $E_{ac}$ and $E''_{ac}$. Through a judicious use of transformers so as to compensate for the winding ratios of the various core windings, a single A. C. source may be utilized for the various $E_z$ and $E_{ac}$ voltages.

The operation of amplifier 101 has been described, and the magnetic amplifiers following amplifier 101 are essentially the same. The pulse output of amplifier 101 appearing across resistance 111 is applied to amplifier 103 during the reset half-cycle of operation of that amplifier whereby the magnetization level of that amplifier is controlled. As a result, the voltage appearing across resistance 111 (henceforth termed $E'_c$) determines the extent to which the saturable core associated with amplifier 103 is withdrawn from saturation on reset half-cycles of operation. If the number of voltseconds in the pulse of $E'_c$ is small, due to a small $E_c$, $E'_z$ will withdraw the core of amplifier 103 from saturation to a large extent, and the number of voltseconds in the output pulse across resistance 139 (henceforth termed $E''_c$) will be small. Similarly, if $E'_c$ is large, due to a large $E_c$, the extent to which the core of amplifier 103 is withdrawn from saturation is small and the number of voltseconds in $E''_c$ is proportionally large. Likewise, and for the same reasons, when $E''_c$ is large, the voltage across the output resistance 159 of amplifier 105 is large, and when $E''_c$ is small, said voltage (which will be called $E_k$) is small. By careful circuit design, the number of voltseconds (under steady state conditions) in a given pulse of $E'_c$ can be made equal to the number of voltseconds in the pulse of $E_k$ appearing as a result thereof.

The time relationship between pulses of voltages $E'_c$, $E''_c$ and $E_k$ is illustrated in Figure 1b by correspondingly lettered pulses. For example, the $E'_c$ pulse $A_1$ controls the level of magnetization of amplifier 103 on reset half-cycles of $E'_{ac}$ to produce pulse $A_2$, which in turn controls the level of magnetization of amplifier 105 on reset half-cycles of $E''_{ac}$ to produce pulse $A_3$. Similarly, $E'_c$ pulse $B_1$ produces $E''_c$ pulse $B_2$ which in turn produces $E_k$ pulse $B_3$, and so on. Under any circumstances, it is evident that a given pulse of $E'_c$ (for example, pulse $A_1$ in Figure 1b) will produce a pulse $A_3$ of $E_k$ one cycle later in the operation of the circuit. In other words, amplifiers 101 and 105 have the same forward half-cycles of operation, and a forward half-cycle of operation of amplifier 101 will produce a pulse output from amplifier 105 on the next forward half-cycle of operation. This is evident, as a forward half-cycle of amplifier 101 is a reset half-cycle of amplifier 103 and determines the output of amplifier 103 on its next forward half-cycle one half-cycle later. Likewise a forward half-cycle of amplifier 103 is a reset half-cycle for amplifier 105, and determines the pulse output of amplifier 105 on its next forward half-cycle, which in turn is one half-cycle later. Stated differently, there is an inherent half-cycle delay between successive amplifiers, so that there is a one cycle delay between instantaneous output signals of the first and third amplifiers of three cascade connected amplifiers.

As can be seen from the foregoing discussion that (assuming that the amplifiers 101, 103 and 105, and the various $E_{ac}$ and $E_z$ voltages are all identical) the instant on a given forward half-cycle of operation at which the core of amplifier 101 becomes saturated is the same on the corresponding forward half-cycle of operation (one cycle later) of amplifier 105 at which its core becomes saturated. Therefore when amplifiers 103 and 105 are unity gain amplifiers, a given output pulse of amplifier 101 will contain the same number of voltseconds as a pulse output one cycle later from amplifier 105. If $E_c$ is unchanging, pulses of $E'_c$ and $E_k$, such as $B_1$ and $A_3$, will contain the same number of voltseconds on the same cycles of operation. However, if $E_c$ should change in amplitude from $E_{c1}$ to $E_{c2}$ as indicated at time $t_a$ in Figure 1b, the first pulse output $B_3$ of amplifier 105 following the change in $E_c$ voltage will still be indicative of $E_{c1}$ due to the delay of the amplifiers 103 and 104 but the first output pulse $C_1$ for amplifier 101 after the change in $E_c$ voltage will be indicative of $E_{c2}$. The pulse $B_0$ represents the difference in the amplitude of pulses $C_1$ and $B_3$ and will thus be indicative of the change in amplitude of $E_c$ over the time interval covered by one cycle of operation. Similarly, the pulse output $D_3$ represents the difference between $D_3$ and $E_c$ occasioned by the restoration in $E_c$ to its original value at time instant $t_b$. The output of difference taker 161 is the difference between these two voltages, the voltage derived thereby being proportional to $$\frac{\Delta E_c}{\Delta t}$$

which is the desired relationship. The sense of the change in $E_c$, either in a positive or negative direction, will be indicated by the polarity of $E_o$.

Figure 2 illustrates another embodiment of the present invention that is useful where it is desired to have a circuit more sensitive to circuit changes than that shown in Figure 1a. This second embodiment is sensitive to changes over a time interval of one-half cycle of the alternating voltage $E_{ac}$, rather than over a full cycle as is the case with the embodiment shown in Figure 1a.

Referring to Figure 2, 200, 210, 230 and 240 represent magnetic amplifiers similar to those shown in Figure 1a. Amplifiers 200 and 210 are connected in parallel to control voltage $E_c$. Alternating voltages $E_z$ which are connected between the junction of winding 201 of amplifier 200 and winding 211 of amplifier 210 and ground are supplied from opposite ends of the secondary of center tapped transformer 221 and ground; alternating voltages $E_{ac}$ being likewise supplied from opposite ends of transformer 222 and ground. Amplifiers 200 and 210 have a common load resistor 220 connected in parallel thereto, unilateral impedance element 204 coupling the winding 202 of amplifier 200 to resistor 220 and unilateral impedance element 214 coupling winding 212 of amplifier 210 to the resistor. The alternating voltages $E_z$ and $E_{ac}$ are phased so that the instantaneous polarities for one half-cycle are as indicated in Figure 2, the terminal of transformer 221 connected to winding 201 being positive with respect to ground when the terminal of transformer 222 connected to winding 202 is negative, the terminal of transformer 221 connected to winding 211 at the same instant being negative with respect to ground when the terminal of transformer 222 connected to winding 212 is positive.

Amplifiers 230 and 240 are exactly the same as corresponding amplifiers 200 and 210, and are similarly connected to transformers 223 and 224, transformer 223 corresponding to transformer 221 and transformer 224 corresponding to transformer 222. Transformer 223 supplies alternating voltage $E'_z$ to control winding 231 of amplifier 230 and to control winding 241 of amplifier 240. Similarly, transformer 224 supplies alternating voltage $E'_{ac}$ to winding 232 of amplifier 230 and to winding 242 of amplifier 240. Unilateral impedance elements 233 of amplifier 230 and 243 of amplifier 240 correspond respectively to elements 203 of amplifier 200 and 213 of amplifier 210, all being connected to the control windings of the cores of their respective amplifiers and polarized so as to prevent current from flowing to the control winding from $E_c$ or $E'_c$ (the voltage across resistance 220) whichever is appropriate. Winding 232 of amplifier 230 and winding 242 of amplifier 240 are coupled to a load resistor 250 by means of unilateral impedance elements 234 and 244 respectively. These impedance elements are likewise polarized to allow current flow only from the load windings to the load resistance 250.

The control signal $E'_c$ for amplifiers 230 and 240 is supplied by the voltage developed at the output of amplifiers 200 and 210 across resistance 220. Amplifiers 230 and 240 are connected in parallel to receive control signal $E'_c$, unilateral impedance elements 233 of amplifier 230, and 243 of amplifier 240 being connected between the ungrounded end of resistance 220 and the terminals of their respective control windings that are not attached to transformer 223.

The operation of the embodiment shown in Figure 2 is as follows. Assume that $E_c$ is of constant amplitude. Under this condition of operation, each of amplifiers 200 and 210 will supply an output across resistance 220 on alternate half-cycles. As the forward half-cycle of one amplifier is the reset half-cycle of the other, pulses will appear across resistance 220 on each half-cycle of operation. Likewise, it can be seen that the forward half-cycle of operation of amplifier 200 is the reset half-cycle of operation of amplifier 240. Therefore, the output pulses from amplifier 200 will determine the level of magnetization reached by the core of amplifier 240 on its reset half-cycle, and consequently will also determine the number of voltseconds in the output pulse of amplifier 240 in its following forward half-cycle. Likewise, an output pulse from amplifier 210 will determine the number of voltseconds in the next output pulse produced during the following forward half-cycle of amplifier 230. As in the embodiment of Figure 1a, by proper circuit design, an output pulse from either amplifier 230 or 240 will contain the same number of voltseconds as the producing pulse from amplifier 200 or 210. Under these circumstances, with a constant amplitude $E_c$, the pulses applied to difference taker 260 will all be of the same amplitude, and no signal will appear at the output thereof.

Assume now that the control signal $E_c$ increases in amplitude at the beginning of the forward half-cycle of amplifiers 200 and 230, that is during the reset half-cycle of amplifiers 210 and 240. The number of voltseconds in the output pulses developed across resistor 220 and 250 during this half-cycle is of course determined by the level of magnetization set during the preceding reset half-cycle of amplifiers 200 and 230 so these output pulses will have no more voltseconds therein than before. But since amplifier 210 is in the process of resetting during this interval its reset magnetization level will not be depressed as far from saturation so that upon the next half-cycle of $E_{ac}$ (forward half-cycle for cores 210 and 240) the output developed across 220 will be increased proportionally to the change in $E_c$. As the number of voltseconds in the output pulse $E_k$ from amplifier 240 during this forward half-cycle will be determined by the amplitude of $E_c$ before its change, there will be an output voltage from difference taker 260 that, as in the embodiment of Figure 1a, will be proportional to $$\frac{\Delta E_c}{\Delta t}$$

In this case, $\Delta t$ is a half-cycle instead of a full cycle of the alternating voltage $E_{ac}$. This increase in $E'_c$ which takes place during the reset half-cycle of 230 will consequently prevent amplifier 230 from being depressed as far from saturation, so that on the next half-cycle the outputs developed across both 220 and 250 will be increased and thus no further output will be delivered from 260 until the next change in $E_c$.

If a constantly varying $E_c$ were placed on either of the embodiments heretofore described, the rate of change indicated by the $E_o$ obtained would be that of the average $E_c$ over a reset half-cycle. Therefore minor variations in $E_c$ would not be instantaneously reflected in $E_o$, but would appear as an average value. If these minor variations were sinusoidal and of a high frequency relative to that of $E_{ac}$, or otherwise of a similar regularly varying form, they would not appear at all in $E_o$.

It is obvious that the various voltages $E_z$, $E_{ac}$, $E'_z$, $E'_{ac}$, $E''_z$ and $E''_{ac}$ in both embodiments are to be supplied from a single source of alternating voltage, as the various voltages are either in phase or 180° out of phase.

Although the embodiments disclosed in the preceding specification are preferred, other modifications will be apparent to those skilled in the art which do not depart from the scope of the broadest aspects of the present invention.

The invention described herein may be manufactured and used by or for the Government of the United States of America for governmental purposes without the payment of any royalties thereon or therefor.

What is claimed is:

1. Apparatus for determining the time derivative of an input signal from an input signal source over discrete intervals of time comprising an input signal, an A. C. voltage source, saturable reactor means connected to the input signal source and to the A. C. voltage source for deriving a first signal proportional to the amplitude of said input signal during first time intervals corresponding to given alternate half-cycles of said alternating voltage source, second signals proportional to the amplitude of said input signal during second time intervals corresponding to half-cycles of said alternating voltage a given number of half-cycles immediately preceding said first time interval; and means connected to said saturable reactor means operative to derive a signal proportional to the instantaneous difference between said first signals and said second signals.

2. Apparatus for determining the time derivative of an input signal over discrete intervals of time comprising a saturable core alternating current magnetic amplifier means operable to produce first output pulses on first alternate half-cycles of operation the time integral of each of which pulses is proportional to time integral of the amplitude of said input signal over the previous half-cycle of operation, further saturable core alternating current magnetic amplifier means coupled to the output of the first mentioned amplifier and operable to produce second output pulses on first alternate half-cycles of operation the time integral of each of which is proportional to the time integral of the amplitude of a first output pulse on a given preceding first half-cycle of operation, and means for differentially combining the first and second output pulses.

3. A magnetic amplifier differentiating circuit comprising a pair of magnetic amplifiers each of which has alternately a forward half-cycle during which an output pulse is produced and a reset half-cycle during which the magnetization level of the amplifier is set, means connected to the first of said amplifiers operable to set the magnetization level thereof in response to the input signal to be differentiated, means connected to the second of said amplifiers operable to set the magnetization level thereof in response to the output signal of the first of said amplifiers, and means for differentially combining the outputs of said first and second amplifiers.

4. A magnetic amplifier differentiating circuit comprising a pair of magnetic amplifiers each of which has alternately a forward half-cycle during which an output pulse is produced and a reset half-cycle during which the magnetization level of the amplifier is set, signal means connected to the first of said amplifiers operable to set the magnetization level thereof in response to the instantaneous level of the input signal to be differentiated, signal means connected to the second of said amplifiers operable to set the magnetization level thereof in response to the output signal of the first of said amplifiers, and means for differentially combining the output pulses of said first and second amplifiers.

5. A magnetic amplifier differentiating circuit comprising a pair of magnetic amplifiers each of which has alternately a forward half-cycle during which an output pulse is produced and a reset half-cycle during which the magnetization level of the amplifier is set, the voltseconds in said output pulse being functionally related to said magnetization level, means connected to the first of said amplifiers operable to set the magnetization level thereof in response to the input signal to be differentiated, second means connected to the second of said amplifiers operable to set the magnetization level thereof in response to the output signal of the first of said amplifiers, said second means including a third magnetic amplifier having a forward half-cycle corresponding in time to a reset half-cycle of said first and second magnetic amplifiers during which an output pulse is produced, and a reset half-cycle during which the magnetization level of said third amplifier is set corresponding in time to a forward half-cycle of said first and second magnetic amplifiers, and means for differentially combining the outputs of said first and second amplifiers.

6. A magnetic amplifier differentiating circuit comprising first and second alternating voltage magnetic amplifiers each having synchronous forward half-cycles of operation during which respective output pulses are generated proportional to the respective magnetization levels set in the amplifiers during an immediately preceding reset half-cycle of operation, said forward and reset half-cycles of operation alternating in time, means connected to said first amplifier operative to set the magnetization level of said first amplifier on reset half-cycles of operation in response to a control signal, means operative to set the magnetization level of said second amplifier during a reset half-cycle of operation thereof in response to the immediately previous output signal of said first amplifier, and means for deriving a signal proportional to the difference between the outputs of said first and second magnetic amplifiers.

7. A differentiating magnetic amplifier comprising first and second magnetic amplifier means each having alternate first and second half-cycles of operation, each of said amplifiers being operative to derive output pulses of the same polarity during alternate half-cycles of operation proportional to a magnetization level set during the preceding half-cycle of operation by an input signal, means operative to couple a control signal to be differentiated to the input of said first magnetic amplifier, means coupling the output pulses of said first magnetic amplifier means to the input of said second magnetic amplifier means, operative to set the magnetization level of said second magnetic amplifier means during a given half-cycle of operation by a given output pulse of said first magnetic amplifier means, and means operative to derive a signal proportional to the difference between the outputs of said first and second magnetic amplifier means.

8. A differentiating magnetic amplifier comprising first and second magnetic amplifier means each having alternate first and second half-cycles of operation, each of said amplifiers being operative to derive output pulses of the same polarity on alternate half-cycles of operation proportional to a magnetization level set during the preceding half-cycle of operation by an input signal, means operative to couple a control signal to the input of said first magnetic amplifier, means coupling the output pulses of said first magnetic amplifier means to the input of said second magnetic amplifier means, operative to set the magnetization level of said second magnetic amplifier means during a given half-cycle of operation by a given output pulse of said first magnetic amplifier means, and means operative to derive a signal proportional to the difference between the outputs of said first and second magnetic amplifier means.

9. A magnetic differentiating circuit comprising first and second magnetic amplifiers each of which has alternately a forward half cycle during which an output pulse is produced and a reset half cycle during which the magnetization level of the amplifier is set, means connecting said first and said second amplifiers in cascade such that the output pulse of said first amplifier appears as an input pulse to the second of said amplifiers during the reset cycle of said second amplifier, and means for differentially combining the outputs of said first and second amplifiers.

References Cited in the file of this patent

UNITED STATES PATENTS

| 2,437,313 | Bedford | Mar. 9, 1948 |
| 2,481,644 | Callaway | Sept. 13, 1948 |
| 2,609,448 | Bedford et al. | Sept. 2, 1952 |